Dec. 14, 1926.

1,610,581

T. A. O'SHAUGHNESSY

METHOD OF MAKING REFRACTORY GLASS

Filed April 27, 1921

Inventor
Thomas A. O'Shaughnessy.
Emery, Booth, Janney & Varney.
Attys.

Patented Dec. 14, 1926.

1,610,581

UNITED STATES PATENT OFFICE.

THOMAS A. O'SHAUGHNESSY, OF CHICAGO, ILLINOIS.

METHOD OF MAKING REFRACTORY GLASS.

Application filed April 27, 1921. Serial No. 465,050.

The object of the present invention is to provide improved method of making refractory glass plate and articles.

A method embodying the invention will be best understood by reference to the accompanying drawings.

The illustrative plate is characterized by plain or substantially smooth opposite surfaces and internal means to produce a refractory surface effect.

In producing glass plate and articles of this character, a layer of glass may be prepared with an uneven refractory side, i. e., with a side formed or provided with distributed projections or indentations to present light-refracting angularities or other irregularities; and such uneven side may be faced with glass of different refracting power, for example, glass of substantially different density, to fill the hollows of said uneven layer side and provide a plain or substantially smooth surface therefor while obtaining the desired refractive effect by virtue of the differential refraction of the adjacent portions of glass.

According to one practice of carrying out this method, separate layers of transparent glass of different densities may be complementally formed with uneven light-refracting sides; for example, the layers may be formed by molding or rolling hot viscous glass composition into thin sheets or the like, with the aforesaid complemental uneven side formations; and the layers while at fusing heat may be placed face to face, with the said light refracting formations of one layer interfitted with those of the other, and integrated by fusion of their contacting surfaces. The resultant product, in such case, is a solid thickness of transparent glass having smooth opposite surfaces and internal light-refracting formations in the glass structure, superficially indistinct from the surrounding body of glass, thus presenting the general appearance of ordinary plate glass or the like.

Figure 1:
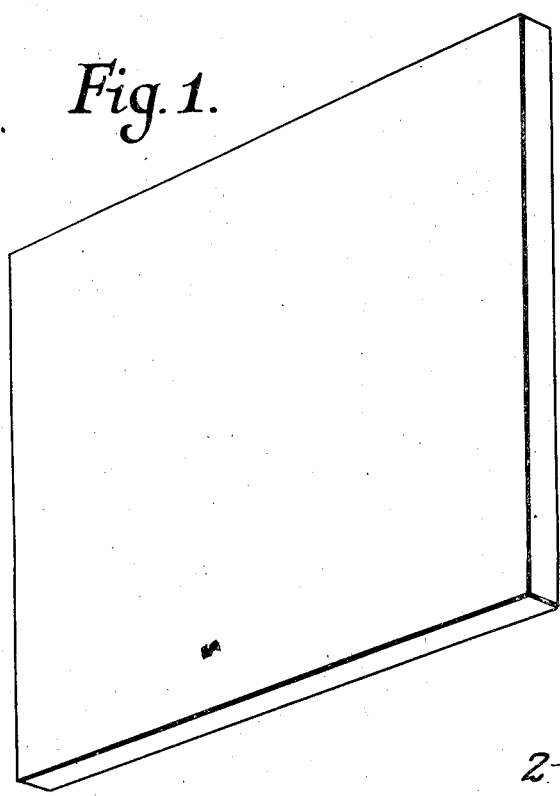
Fig. 1 is a perspective view of one form of glass plate produced under a method of embodying the present invention.
Figure 2:
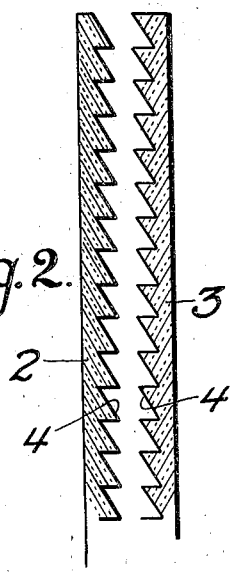
Fig. 2 is a cross-section of layers composing said plate.
Figure 3:
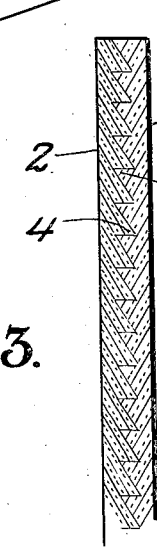
Fig. 3 is a cross-section of said plate.

Figs. 1 and 3 of the drawings represent solid glass plate composed of originally separate layers 2 and 3 (Fig. 2) of transparent glass of different densities complementally formed on their confronting sides with prismatic projections 4 arranged in parallel ribs, the layers being integrated by fusion of their contacting surfaces.

Figure 4:
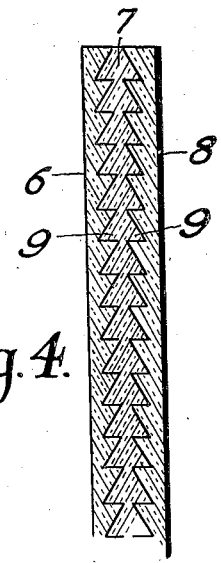
Fig. 4 is a cross-section of another plate produced under a method embodying the invention.

Fig. 4 represents solid glass plate composed of three layers, 6, 7, and 8 of transparent glass of different densities, the intermediate layer being formed with opposite prismatic projections 9, those at one side augmenting the refractive effect of those at the other side. In this case the outer glass layers 6 and 8 are preferably of substantially equal densities but of substantially less or greater density than the glass of the intermediate layer 7. If desired the outer layers 6 and 8 might be ordinary sheets pressed while hot or viscous against the intermediate layer 7.

The prismatic rib projections 4 of a layer side is a highly useful formation for such purposes, for instance, as directing illumination into a room from an elevated window or for deflecting the light rays from an automobile head lamp to prevent objectionable glare. Obviously the prismatic projections may be otherwise arranged on a glass layer, for instance. in intersecting lines, and various light refracting layer side formations may be used for obtaining various desired effects, as diffusion, softening or diversion of light rays.

In the drawings, the line of mergence of adjacent glass layers of a plate is indicated by a faint line, though actually, the layers being integrated by fusion of their contacting surfaces, the prismatic formations will be superficially indistinct from the surrounding body of the glass, and hence a cross-section of plate embodying the invention may superficially resemble a cross-section of ordinary plate glass.

Refractory glass plate of the character described possesses important advantages in strength and adaptability to be kept clean and in clear, bright condition; being superior for many purposes to ordinary refractory plate glass which is objectionably fragile and subject to unavoidable tendency to become dull due to accumulation of dust in the crevices of the light refractory side and by reason of the practical difficulty in cleaning such glass.

By virtue of the strength secured by the laminated structure, and the integration of the prismatic projections of a layer side with an adjacent layer, the respective layers composing the plate may be made comparatively thin; permitting manufacture of plate and other articles embodying the invention which will compare favorably in thickness and weight with ordinary refractory plate glass.

Plate embodying the invention may be made in extensive areas for cutting or subdivision into desired sizes, or glass embodying the invention may be made into desired articles; and it will be understood that plate and articles embodying the invention may be made in forms other than flat, for instance, in curved, bowl-shaped, lamp shade and lens forms.

Obviously the present invention is not limited to any particular construction nor to any particular practice of a method embodying the invention. Moreover it is not indispensable that all the features of the invention be used conjointly as they may be used to advantage in various different combinations and sub-combinations.

I claim—

A method of making smooth-surfaced refractory glass characterized by providing separate layers of transparent glass of different densities having complementally formed uneven light-refracting sides, a said layer having a smooth exterior surface opposite its said uneven surface; superposing said layers with their said complementally formed sides interfitted; and integrating said layers by fusion of their contacting surfaces.

In testimony whereof, I have signed my name to this specification.

THOMAS A. O'SHAUGHNESSY.